June 2, 1925.
F. HENNES
SAUSAGE FILLING MACHINE
Filed Jan. 27, 1925
1,539,901
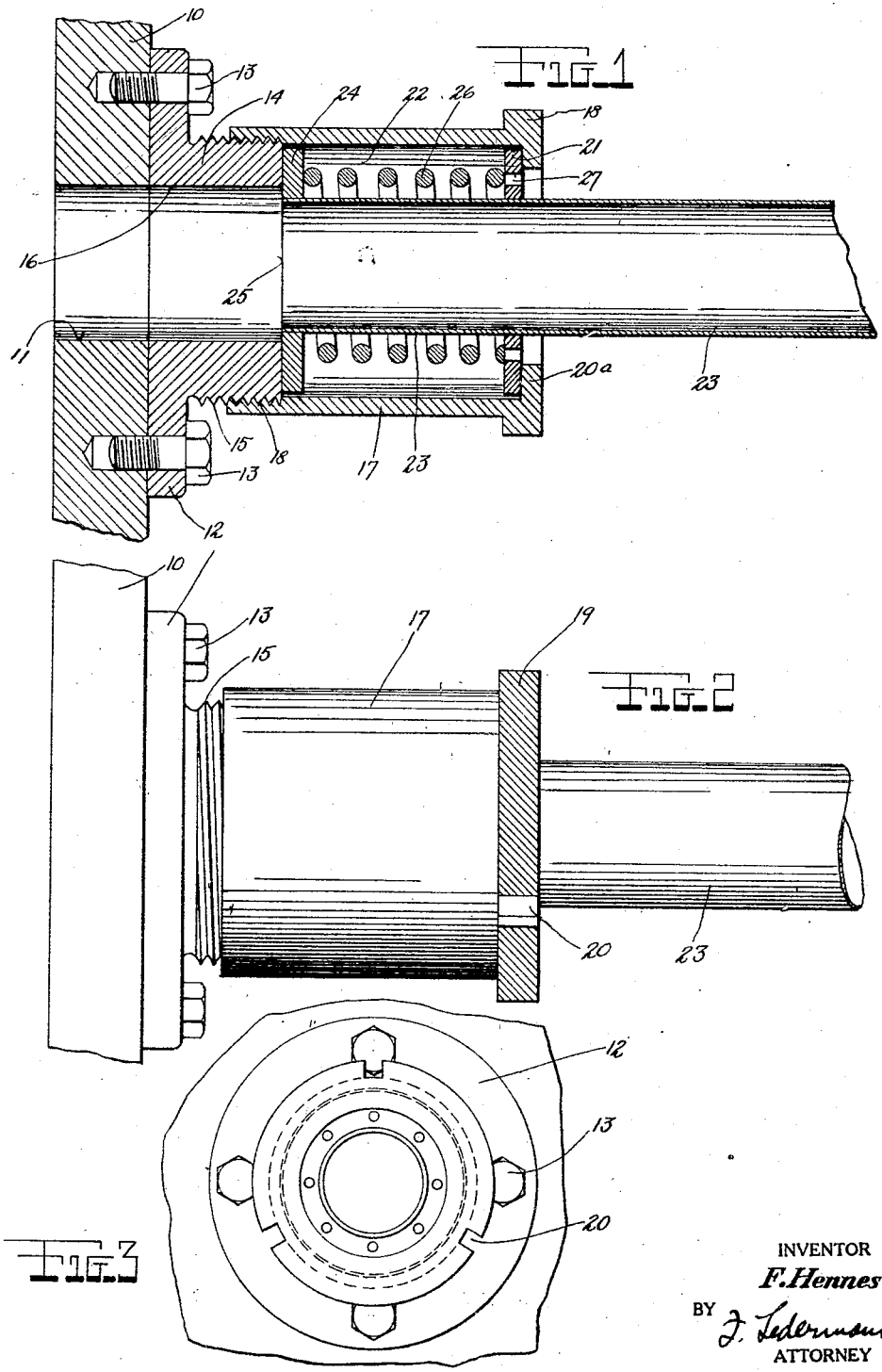
INVENTOR
*F. Hennes*
BY
ATTORNEY Patented June 2, 1925.

1,539,901

UNITED STATES PATENT OFFICE.

FRANK HENNES, OF BETHLEHEM, PENNSYLVANIA.

SAUSAGE-FILLING MACHINE.

Application filed January 27, 1925. Serial No. 5,029.

*To all whom it may concern:*

Be it known that I, FRANK HENNES, a citizen of the United States, residing at Bethlehem, in the county of Northampton and State of Pennsylvania, have invented certain new and useful Improvements in Sausage-Filling Machines, of which the following is a specification.

The main object of this invention is to provide a novel and important type of filling nozzle for sausage making machines. In the usual type of machine, the filling nozzle is designed in such a manner that air blisters are formed within the sausage beneath the casing thereon because the air cannot be released at any point between the sausage material container and the filling nozzle. The type of device illustrated in this application has a floating nozzle which is movable and may be slightly extended to release the air captured within the nozzle during filling of sausages.

The above and other objects will become apparent in the description below, in which characters of reference refer to like-named parts in the drawing.

Referring briefly to the drawing, Figure 1 is a sectional elevational view of the filling nozzle.

Figure 2 is an exterior elevational view of the same.

Figure 3 is a front elevational view of Figure 2.

Referring in detail to the drawing, the numeral 10 indicates the wall forming part of the sausage material container and is provided with a relatively large opening 11. Exterior of the wall, a base flange 12 is secured by bolts 13 which are engaged in threaded holes formed in the wall structure 10. The base flange 12 has an annular projecting hub 14 on the outer periphery of which threads 15 are formed. An opening 16 passes thru the hub and flange and is of the same dimensions as the opening 11 formed in the wall structure 10 and aligns with the latter. A sleeve-like member 17 is provided with internal threads 18 at its open end, the threads being adapted to engage and cooperate with the threads 15 formed on the hub member 14. Said sleeve is proportionately long and is provided with an enlarged rim 18 at one edge whose periphery is knurled, as indicated at 19. This rim is provided with a plurality of radial recesses 20 which are square in outline and are adapted to receive a long projection of the ordinary type of hose wrench by which said sleeve member 17 is securely fastened in place on the hub. An internal flange 20$^a$ is formed intergral with the sleeve member 17 and projects inwardly from the rim 18, the flange forming a shoulder on which a washer 21 is normally seated. Within the chamber 22 of the sleeve member 17, one end of the sausage nozzle 23 is mounted. This end of the nozzle contained within the compartment 22 has a flange 24 rigidly fixed thereto, said flange being normally seated on the base 25 of the hub 14 and is retained in such seated position by a coil spring 26 which encircles the nozzle 23 between the fixed flange 24 and the floating flange 21. The floating flange 21 is provided with a plurality of holes 27 which serve as a means of egress for any air which may circulate into the compartment 22 of the sleeve member 17.

The design illustrated in the several figures is used as a feeding nozzle for filling an organic casing with chopped meat or cereal. The nozzle is used in the following manner. The hub 14, mounted on the base flange 12 being a permanent part of the container in which the sausage material is stored, supports the entire nozzle. The casing of the sausage is generally of long length and is divided up into smaller lengths by twisting the casing at points intermediate its length, thus forming sausages of relatively short lengths. This casing, into which the sausage is pressed, is stretched over the tube nozzle 23, the latter being of any required length suitable for its use. Pressure is then brought to bear on the sausage material stored in the container, of which the wall 10 forms a part, presses the material out of the container thru the openings 11 and 16 and into the nozzle 23 thru which they are ready to deliver into the sausage machine. In passing the sausage material from the container into the nozzle, a quantity of air becomes captured within the feeding mechanism, and ordinarily with the usual type of feeding nozzle, cannot be released and enters into the sausage casing forming air blisters. Sausages having air blisters decrease the filling content of the individual sausage and are also an unpleasant thing to prepare for meals, as the air blisters in the sausage explode and rupture the casing. In order to release the air before it enters into the sausage casing, the nozzle 23 is formed as a floating member. When it is seen that air is entering into the sausage casing, the operator of the nozzle grasps the nozzle 23 and extends the same against the tension of the spring 26 so that the flange 24 fixed to the nozzle end 23 is lifted from its seat 25, thus creating a place thru which the captured air may be released into the chamber 22 from which it may circulate outwardly thru the openings 27.

I claim:—

1. A device of the class described comprising a tubular member providing a filling nozzle for sausage meat, a hub aligned with said nozzle, and means for yieldably securing the filling nozzle on the hub.

2. A device of the class described comprising a filling nozzle, a flange integral with one end of said nozzle, a hub and base mounted on a container, said nozzle communicating with the container thru the hub, and a sleeve mounted on said hub for yieldably securing the nozzle on the hub.

3. A device of the class described comprising a filling nozzle, a flange integral with one end of said nozzle, a hub and base mounted on a container, said nozzle communicating with the container thru the hub, said hub having external threads thereon, a sleeve having threads at one end to engage said hub, the flanged end of said nozzle being adapted to be housed in said sleeve, and means in said sleeve cooperating with the flange on said nozzle for normally retaining the nozzle flange seat on said hub.

4. A device of the class described comprising a filling nozzle, a flange integral with one end of said nozzle, a hub and base mounted on a container, said nozzle communicating with the container thru the hub, said hub having external threads thereon, a sleeve having threads at one end to engage said hub, the flanged end of said nozzle being adapted to be housed in said sleeve, a spring mounted in said sleeve and encircling said nozzle, said spring being adapted to seat the nozzle flange yieldably on said hub.

5. A device of the class described comprising a filling nozzle, a flange integral with one end of said nozzle, a hub and base mounted on a container, said nozzle communicating with the container thru the hub, said hub having external threads thereon, a sleeve having threads at one end to engage said hub, the flanged end of said nozzle being adapted to be housed in said sleeve, a spring mounted in said sleeve and encircling said nozzle, said spring being adapted to seat the nozzle flange yieldably on said hub, and a floating flange having holes therein mounted slidably on the filling nozzle within the sleeve adapted to release the air from within the sleeve chamber.

In testimony whereof I affix my signature.

FRANK HENNES.